United States Patent
Onwuneme et al.

(10) Patent No.: US 12,505,179 B1
(45) Date of Patent: Dec. 23, 2025

(54) SYSTEM AND METHOD FOR MUXING AND STORING MANIFEST FILE IN A STORAGE SERVER

(71) Applicant: Identities.AI, Inc., Seattle, WA (US)

(72) Inventors: Chuks Onwuneme, Seattle, WA (US); Mika Passila, Helsinki (FI)

(73) Assignee: Identities.AI, Inc., Seattle, WA (US)

( * ) Notice: Subject to any disclaimer, the term of this patent is extended or adjusted under 35 U.S.C. 154(b) by 0 days.

(21) Appl. No.: 18/963,464

(22) Filed: Nov. 27, 2024

Related U.S. Application Data

(60) Provisional application No. 63/685,382, filed on Aug. 21, 2024.

(51) Int. Cl.
G06F 21/00 (2013.01)
G06F 21/10 (2013.01)
G06F 21/60 (2013.01)

(52) U.S. Cl.
CPC ........ *G06F 21/1085* (2023.08); *G06F 21/602* (2013.01)

(58) Field of Classification Search
None
See application file for complete search history.

(56) References Cited

U.S. PATENT DOCUMENTS

| 10,560,748 B2 | 2/2020 | Cugi et al. |
| 10,601,887 B2 | 3/2020 | Knox et al. |
| 11,611,808 B2 | 3/2023 | Thorwirth |
| 2002/0012432 A1 | 1/2002 | England et al. |
| 2018/0139186 A1* | 5/2018 | Castagna ............... H04L 63/12 |
| 2019/0373339 A1* | 12/2019 | Bradley ............... H04L 9/0637 |
| 2020/0226267 A1* | 7/2020 | Bengston ............... G06F 16/27 |
| 2021/0227275 A1* | 7/2021 | Nonnenmacher ........................... H04N 21/25808 |

(Continued)

FOREIGN PATENT DOCUMENTS

| GB | 2627287 | 8/2024 | |
| WO | WO-2021021214 A1 * | 2/2021 | ....... H04N 21/26258 |

OTHER PUBLICATIONS

"How to create Widevine DRM protected content," Bitmovin, retrieved from the Internet on Nov. 29, 2024, at https://developer.bitmovin.com/encoding/docs/how-to-create-widevine-drm-protected-content, 4 pages.

(Continued)

*Primary Examiner* — Shin-Hon (Eric) Chen
(74) *Attorney, Agent, or Firm* — Lowe Graham Jones PLLC; Mark P. Walters; Ellen M. Bierman

(57) ABSTRACT

The disclosed system (110) and method (500) enables muxing and storing a manifest file in a storage server (122). The method (500) includes receiving (502) one or more input streams from at least one streaming service. The input streams are received by an authorization unit communicatively coupled to a streaming server. The received one or more input streams are encoded (504) by an encoder using one or more predefined codec configurations to generate corresponding one or more encoded streams. The generated one or more encoded streams are multiplexed (506) by a muxer into at least one muxing. The muxing includes livestream data and embedded metadata. Further, at least one of the muxing and one or more input/output (I/O) services are linked (508) into a manifest file that is stored in a storage server.

20 Claims, 6 Drawing Sheets

(56) References Cited

U.S. PATENT DOCUMENTS

2022/0337898 A1* 10/2022 Dorogusker ....... H04N 21/2187
2023/0345064 A1* 10/2023 Diep ................... H04N 21/8456
2024/0022408 A1*  1/2024 Roper .................... H04L 65/403
2024/0196031 A1*  6/2024 Utile ........................ G06F 3/165

OTHER PUBLICATIONS

Cluff, Phil, "Introducing DRM: The latest tool in protecting your content on Mux," Mux, Jul. 11, 2024, retrieved from the Internet on Nov. 29, 2024, at https://www.mux.com/blog/introducing-drm-the-latest-tool-in-protecting-your-content-on-mux, 9 pages.
"Video Manifests: Demystifying the Intricacies," Written by Anne, Coconut, retrieved from the Internet on Nov. 29, 2024, at https://www.coconut.co/articles/demystifying-video-manifests, 7 pages.
International Search Report and Written Opinion of the International Searching Authority dated Sep. 29, 2025, in International Patent Application No. PCT/US2025/043036, 7 pages.

* cited by examiner

SYSTEM AND METHOD FOR MUXING AND STORING MANIFEST FILE IN A STORAGE SERVER

PRIORITY CLAIM

This application claims the benefit of priority from U.S. Provisional Patent Application No. 63/685,382, filed Aug. 21, 2024, the contents of which are incorporated herein by reference.

FIELD OF INVENTION

The embodiments of the present disclosure generally relate to a field of embedding metadata in media being delivered in real-time over wireless networks, and specifically to a system and a method for muxing and storing a manifest file in a storage server.

BACKGROUND OF INVENTION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

With the rise of the Internet, streaming technology has made it easier for users to access nearly any media they want. While digital service providers (DSPs) have made media access more convenient, tracking every streamed media, their origin and authenticity has become a growing challenge. The DSPs often claim they lack necessary data and technology to verify legitimacy of media or locate rightful parties from whom the media originated. Further, absence of a comprehensive and authoritative database of existing media compounds the issue. Additionally, there is a lack of an efficient mechanism to store encrypted multiplexed media streams as manifest files for easy access and validating their authenticity.

There is, therefore, a need in the art to provide an improved system and a method to multiplex and store the manifest file in a storage server.

OBJECTS OF THE INVENTION

Some of the objects of the present disclosure, which at least one embodiment herein satisfies are listed herein below.

It is an object of the present disclosure to provide a system and a method for muxing and storing a manifest file in a storage server.

It is an object of the present disclosure to provide a system and method that uses the manifest file to determine users whose claims to a media stream are legitimate, or even to locate certain legitimate users.

It is an object of the present disclosure to provide a system and a method for maintaining the storage server in form of a blockchain.

It is an object of the present disclosure to provide a system and a method where the blockchain utilizes Ethereum as a blockchain platform.

It is an object of the present disclosure to provide a system and a method for maintaining embedded metadata at a streaming server.

It is an object of the present disclosure to provide an embedded metadata that has information related to metadata settings, ownership, resolution, bitrate, and quality settings corresponding to a codec.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a method for receiving by an authorization unit communicatively coupled to a streaming server one or more input streams from at least one streaming service. The method may use an encoder associated with the authorization unit to encode the received one or more input streams using one or more predefined codec configurations to generate corresponding one or more encoded streams. Further, the method may multiplex the generated one or more encoded streams into at least one muxing using a muxer. The muxer is operatively associated with the authorization unit. The at least one muxing includes livestream data and embedded metadata. The method may link at least one of the muxing and one or more input/output (I/O) services into a manifest file. The manifest file is stored in a storage server.

In an embodiment, the embedded metadata is maintained at the streaming server. The embedded metadata comprises one or more codec parameters.

In an embodiment, the one or more codec parameters are any or a combination of information related to metadata settings, ownership, resolution, bitrate, and quality settings corresponding to a codec.

In an embodiment, the one or more codec parameters are used to determine an origination source of the one or more encoded streams and a degree of authenticity of the livestream data.

In an embodiment, the storage server is further configured to store the manifest file in a database of records that are arranged in a sequence of verification units.

In an embodiment, the sequence of verification units correspond to at least one of a database or a blockchain of a plurality of blocks or a distributed data store. Each block comprises a cryptographic hash of a previous block of records of the manifest file.

In an embodiment, the blockchain utilizes Ethereum as a blockchain platform.

In an embodiment, at least one of the muxing is maintained in either an unencrypted form and an encrypted form.

In an embodiment, the method may execute an encryption of at least one of the muxing by a Digital rights management (DRM) unit operatively coupled to the authorization unit.

In an aspect, the present disclosure relates to a system comprising an authorization unit communicatively coupled to a streaming server. The system comprises a memory operatively coupled to an encoder and a muxer of the authorization unit. The memory comprises processor-executable instructions, which on execution, may cause the one or more processors to receive one or more input streams from at least one streaming service. The one or more processors may be configured to encode the received one or more input streams using one or more predefined codec configurations to generate corresponding one or more encoded streams. The one or more processors may be configured to multiplex the generated one or more encoded streams into at least one muxing, wherein the at least one muxing comprises livestream data and embedded metadata. Further, the one or more processors may be configured to link at least one of the muxing and one or more input/output (I/O) services into a manifest file. The manifest file is stored in a storage server.

In an aspect, the present disclosure relates to non-transitory computer-readable medium comprising processor-executable instructions that may cause a processor to receive one or more input streams from at least one streaming service. The one or more processors may encode the received one or more input streams using one or more predefined codec configurations to generate corresponding one or more encoded streams. Further, the one or more processors may multiplex the generated one or more encoded streams into at least one muxing, wherein the at least one muxing comprises livestream data and embedded metadata. Furthermore, the one or more processors may link at least one of the muxing and one or more input/output (I/O) services into a manifest file. The manifest file is stored in a storage server.

BRIEF DESCRIPTION OF DRAWINGS

The accompanying drawings, which are incorporated herein, and constitute a part of this disclosure, illustrate exemplary embodiments of the disclosed methods and systems which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components, or circuitry commonly used to implement such components.

Figure 1:
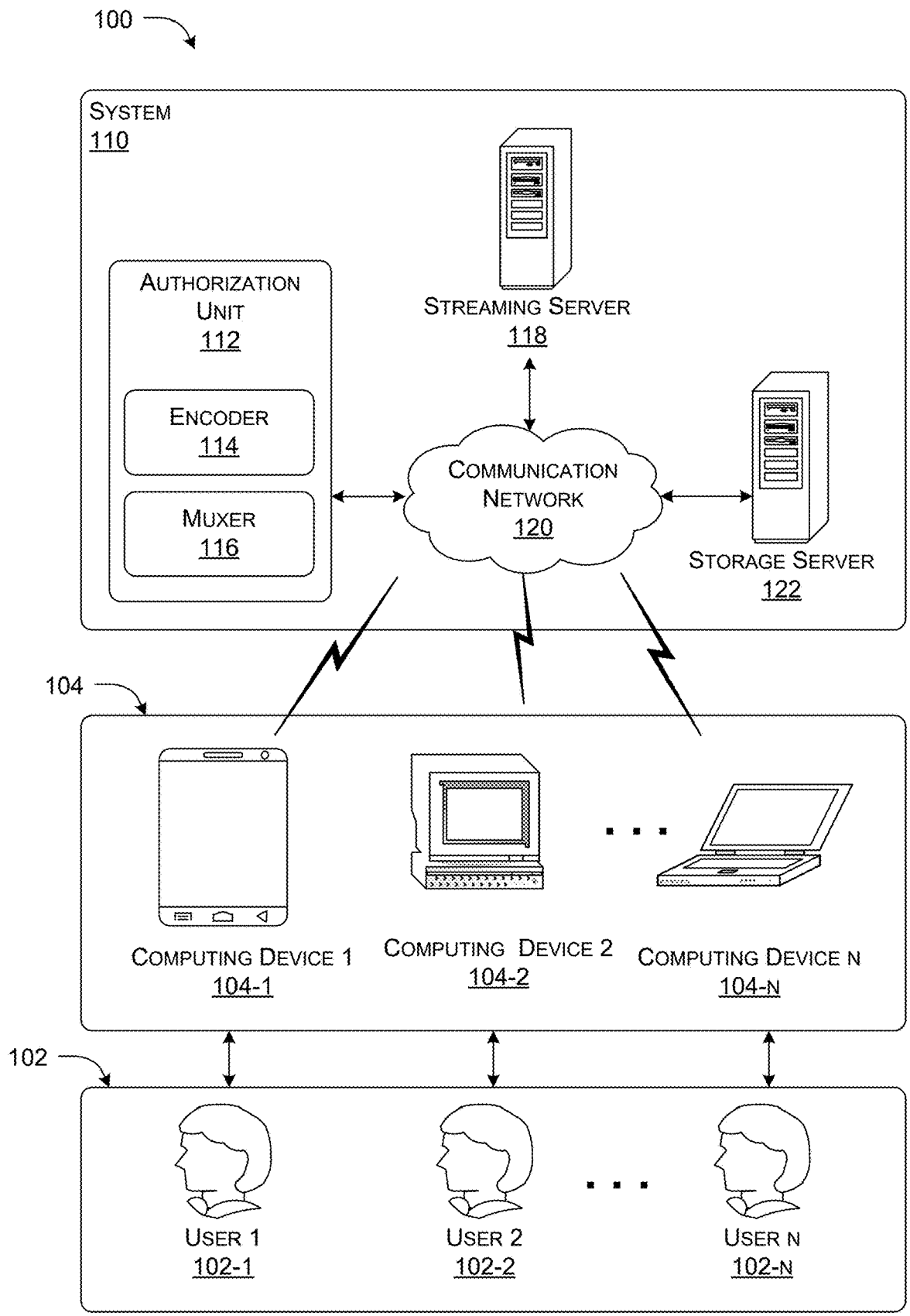
FIG. 1 illustrates an exemplary block diagram representation of a network architecture implementing a proposed system, in accordance with an embodiment of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive in a manner similar to the term "comprising" as an open transition word without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an", and "the" are intended to include the plural forms as well, unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The disclosure outlines a workflow for bitstream muxing and encoding, detailing how various objects are created, manipulated, stored, and how they interact with each other. A process allows users to personalize their livestream data with a permanent watermark and store a watermarked livestream in a storage server, for example, a blockchain. The watermark indicates an origin of the livestream data. Further, an encoding is done on the livestream data that represents the workflow that allows a bitstream encoder to first retrieve one or more InputStreams from input services, encode the InputStreams using codec configurations to create streams, multiplex the streams into muxings and output the muxings to output services.

Various embodiments of the present disclosure will be explained in detail with reference to FIGS. 1-6.

FIG. 1 illustrates an exemplary block diagram representation of a network architecture 100 implementing a proposed system 110 for the muxing and storing of a manifest file in the storage server, according to embodiments of the present disclosure. The network architecture 100 may include the system 110, an authorization unit 112, an encoder 114, a muxer 116, a streaming server 118 and a storage server 122. The system 110 may be communicatively connected to the streaming server 118 and the storage server 122, via a communication network 120. The streaming server 118 may include, but is not limited to, a web server that provides live or on-demand media content, such as movies, TV shows, video, games, podcasts, music, and audio content to user devices via an internet connection. The communication network 120 may be a wired communication network or a wireless communication network. The wireless communication network may be any wireless communication network capable of transferring data between entities of that network such as, but is not limited to, a carrier network including a circuit-switched network, a public switched network, a Content Delivery Network (CDN) network, a Long-Term Evolution (LTE) network, a New Radio (NR), a Global System for Mobile Communications (GSM) network and a Universal Mobile Telecommunications System (UMTS) network, an Internet, intranets, Local Area Networks (LANs), Wide Area Networks (WANs), mobile communication networks, combinations thereof, and the like. The storage server 122 may not limited to, a stand-alone server, a remote server, a cloud computing server, a dedicated server, the blockchain, a rack server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof, and the like.

The system 110 may be implemented by way of a single device or a combination of multiple devices that may be operatively connected or networked together. For example, the system 110 may be implemented by way of a standalone device such as the storage server 122 (and/or a decentralized server), and the like. In yet another example, the system 110 may be implemented in/associated with respective computing devices 104-1, 104-2, . . . , 104-N (individually referred to as computing device 104, and collectively referred to as computing devices 104), associated with one or more user 102-1, 102-2, . . . , 102-N (individually referred to as the user 102, and collectively referred to as the users 102). In such a scenario, the system 110 may be replicated in each of the computing devices 104. The users 102 may be, but are not limited to, a TV viewer, an audio listener, a web page user, and the like. In some instances, the user 102 may include an entity or an administrator, a speaker who is in conversation with the computing device 104. The computing device 104 may be at least one of, an electrical, an electronic, and an electromechanical device. The computing device 104 may include, but is not limited to, a mobile device, a smartphone, a Personal Digital Assistant (PDA), a tablet computer, a phablet computer, a wearable device, a Virtual Reality/Augmented Reality (VR/AR) device, a laptop, a desktop, a server, and the like. The system 110 may be implemented in hardware or a suitable combination of hardware and software.

In an embodiment, the system 110 may use the authorization unit 112 that is communicatively coupled to the streaming server 118 to receive one or more input streams from a streaming service. The streaming service (also known as a streaming media service) is an online service that enables users to watch or listen to content such as movies, TV shows, music, or podcasts directly over the internet. Instead of downloading an entire file to user's device, the user may stream required content in real-time, allowing immediate access without waiting for full download of the media. Popular examples of the streaming service are Netflix, Spotify, YouTube, and Disney+. Additionally, an over-the-top (OTT) media service refers to the streaming service that is delivered directly to the users via the internet.

The system 110 may use the encoder 114 associated with the authorization unit 112 to encode the received one or more input streams. Further, the system 110 may use the predefined codec configurations to generate corresponding one or more encoded streams. Furthermore, a Digital rights management (DRM) unit may encrypt the muxing.

In an embodiment, the system 110 may use the muxer 116 to multiplex the generated one or more encoded streams into at least one muxing. Typically, all audio and video streams have a variable bit rate, and a software that facilitates to generate a transport stream or a container is typically referred to as a multiplexer or the muxer 116. As is known, multiplexing is a technique used by networks to consolidate multiple signals, that are digital or analog, into a single composite signal. Further, the composite signal may be transported over a common medium, such as a fiber optic cable or a radio wave. Typically, the multiplexer is used in fields such as telecommunications, data communication systems, and analog-to-digital converters.

In an embodiment, at least one of the muxing includes livestream data and embedded metadata. The embedded metadata may be maintained at the streaming server and includes the codec parameters. The codec parameters may be any or a combination of information related to metadata settings, ownership, resolution, bitrate, and quality settings corresponding to the codec. In addition, at least one of the muxing may be maintained in either an unencrypted form and an encrypted form.

In an embodiment, the codec parameters may be used to determine an origination source of the one or more encoded streams and a degree of authenticity of the livestream data.

In an embodiment, the authorization unit 112 may link at least one of the muxing and one or more input/output (I/O) services into a manifest file. The manifest file may be stored in the storage server 122. The storage server 122 may be configured to store the manifest file in a database of records that are arranged in a sequence of verification units that may correspond to at least one of the databases or the blockchain of the plurality of blocks or the distributed data store. Each of the blocks of the blockchain may comprise a cryptographic hash of a previous block of records of the manifest file. In an embodiment, Ethereum as the blockchain platform may be used.

By way of an example, in a Web3 context, the manifest file may link generated files and streams to blockchain-based records to create a unique token (Non-Fungible Token (NFT)) that represents ownership of the records. This ensures that ownership and provenance of the records are verifiable on the blockchain.

In some implementations, a live action may be performed on the bitstream. This includes adding a watermark to the bitstream in real time. The watermark may be of any type such as audio, text, video, omg, and the like, and may be added to the bitstream so as to uniquely authenticate the user. The added watermark may serve as a unique signature and may be viewed in real time of a live stream by either the user or an administrator. The watermark may be viewed by taking samples for bytes and saving them into the manifest file that is persisted to the database or the blockchain.

In other implementations, offline actions may be performed on the bitstream. The offline actions enable to reprocess a static file of any type, and post-process the watermark/the signature. This mechanism may help to verify any static file of its authenticity (upload, process, show results). This check for the authenticity may be done by taking samples for the bytes and saving them into the manifest file persisted to the database or the blockchain.

In some implementations, the system 110 may include data, and modules. As an example, the data may be stored in a memory configured in the system 110. In an embodiment, the data may be stored in the memory in the form of various data structures. Additionally, the data may be organized using data models, such as relational or hierarchical data models.

In an embodiment, the data stored in the memory may be processed by the modules of the system 110. The modules may be stored within the memory. In an example, the modules communicatively coupled to the processor configured in the system, may also be present outside the memory, and implemented as hardware. As used herein, the term modules refer to an Application-Specific Integrated Circuit (ASIC), an electronic circuit, a processor (shared, dedicated, or group) and the memory that execute one or more software or firmware programs, a combinational logic circuit, and/or other suitable components that provide the described functionality.

Further, the system 110 may also include other units such as a display unit, an input unit, an output unit, and the like, however the same are not shown in FIG. 1, for the purpose of clarity. Also, in FIG. 1 only a few units are shown, however, the system 110 or the network architecture 100 may include multiple such units or the system 110/network architecture 100 may include any such numbers of the units, obvious to a person skilled in the art or as required to implement the features of the present disclosure. The system 110 may be a hardware device including the processor executing machine-readable program instructions for the muxing and storing of the manifest file in the storage server 122.

The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors. The processor may include, for example, but are not limited to, microprocessors, microcomputers, microcontrollers, digital signal processors, central processing units, state machines, logic circuits, and any devices that manipulate data or signals based on operational instructions, and the like. Among other capabilities, the processor may fetch and execute computer-readable instructions in the memory operationally coupled with the system 110 for performing tasks such as data processing, input/output processing, and/or any other functions. Any reference to a task in the present disclosure may refer to an operation being performed or the task that may be performed on data.

In an embodiment, the system 110 uses an Identities.ai service which is an advanced service that is designed to enhance and secure real-time, user-controlled bitstream encoding for data streams such as audio and video. The service offers several cutting-edge functionalities such as:
  (a) Real-time data stream hashing: Identities.ai may continuously compute hash values for the data stream, enabling immediate detection of any alterations or tampering, ensuring data integrity.
  (b) Watermarking: The service may embed unique, tamper-proof watermarks into the data stream which are traceable back to an individual user, providing proof of ownership and authenticity.
  (c) Digital Rights Management (DRM): Identities.ai may integrate the DRM to control and restrict access to the data stream, thus preventing unauthorized use or distribution.
  (d) Identity verification services: This service uses advanced techniques to verify an identity of an owner of the stream, thus adding an extra layer of security by ensuring rightful control over the data.
  (e) Multiplexing (Muxing): This service combines a raw data stream with a user's digital signature using the muxing, ensuring that the stream and an individual's identity are inextricably linked.
  (f) Enhanced data stream: After the muxing, the stream may be enhanced with traceable blocks that verify the owner's identity, approval status, and data integrity, ensuring the stream remains unaltered and verified.
  (g) Manifesting: Once enhanced, the data stream may be routed through manifest tooling and stored on the blockchain as a smart contract, creating an immutable record.

By integrating these features, the Identities.ai service offers a comprehensive solution for securing real-time data streams, thereby ensuring that the data streams remain authentic, traceable, and protected from unauthorized use or tampering.

Various components of the Identities.Al service are listed under multiple categories. Hardware components may include, for example, an audio device, a video device, a camera device, multiple files, a fingerprint scanner, an eye scanner, any identity scanner, and the like.

A Native client may provide services, such as managing hardware resources (input), rerouting integrated services (muxing), managing Identities.DNA configurations, managing Identities DNA tokens, managing Identities. DNA wallet, managing Software as a Service (SaaS) account, managing output, DRM management, voice DNA sample management, and capture DNA sample management.

A SaaS client may include managing identities DNA configurations, managing identities DNA tokens, managing Identities DNA wallet, managing SaaS account, managing output, Digital Rights Management (DRM), Voice DNA sample management, capturing DNA sample management, downloading client application, corporation management, user profile management, registering new individual user, registering new corporation group, adding corporation group user, managing corporation group users, managing blockchain capabilities, and managing file system.

The Identities.AI service may connect to the blockchain, the server and an integrations through a Representational State Transfer Application Programming Interface (REST API)/internet. The blockchain may be used to maintain, for example, wallet management, tokens, NFTS, smart contracts and history. The server may be used for purposes such as user management, corporation management, integration management, blockchain management, DNA sample file management, history management, and authentication. Further, the integrations may be used for services, such as Zoom meeting (AI companion), Teams meeting (AI companion), Google meets (AI companion), Phone call application, Video call application, Camera application and Blockchain (Solana, Etherium, Runes). In an implementation, a 2-factor voice authentication may be performed to use voice verification as a method for authenticating human realness and use a concept of social vouching for checking human realness, where existing authorized users on the platform may vouch for new users coming on the platform. As may be appreciated, this is may be done manually.

Real time authentication in a phone-to-phone live call: It is becoming increasingly prevalent that many people are targets of phone phishing attempts, whereby the perpetrators call a known person and pretend to be their family or a trusted contact, either in a live manner or by using an AI-derived voice. This is a method that can help deter this form of phishing: (1) a platform that can register a user's device to the system is used by all parties who install the system (an application) on their device, e.g. a phone; (2) the user authorizes that the application retrieves some private information about the device, such as an apple device id (in the case of iPhones); (3) the application registers the user's unique device id to the manifest, which is persisted on a server database, or blockchain; (3) the application, installed on the user's device, listens for phone calls in the background mode; (4) when a phone call is received, prior to the user answering the call, the background application service retrieves the phone number (caller id) of the incoming call and checks the manifest/database for existing contact; and (5) if it finds a contact, the application checks the unique device id, and verified that the phone number and device id match; (7) if there is a match, the application displays to the user that this phone call is truly from the contact; and (8) if it does not match, there is an alternate display/notification warning the user to beware of scams if they decide to pick up the call. This method and system can be used to create a closed loop of trusted contacts, where every contact registers their device/phone number with the application, and the manifest is used in background mode during phone calls to give an extra warning to the user to prevent fraudulent calls/impersonation attempts.

Figure 2:
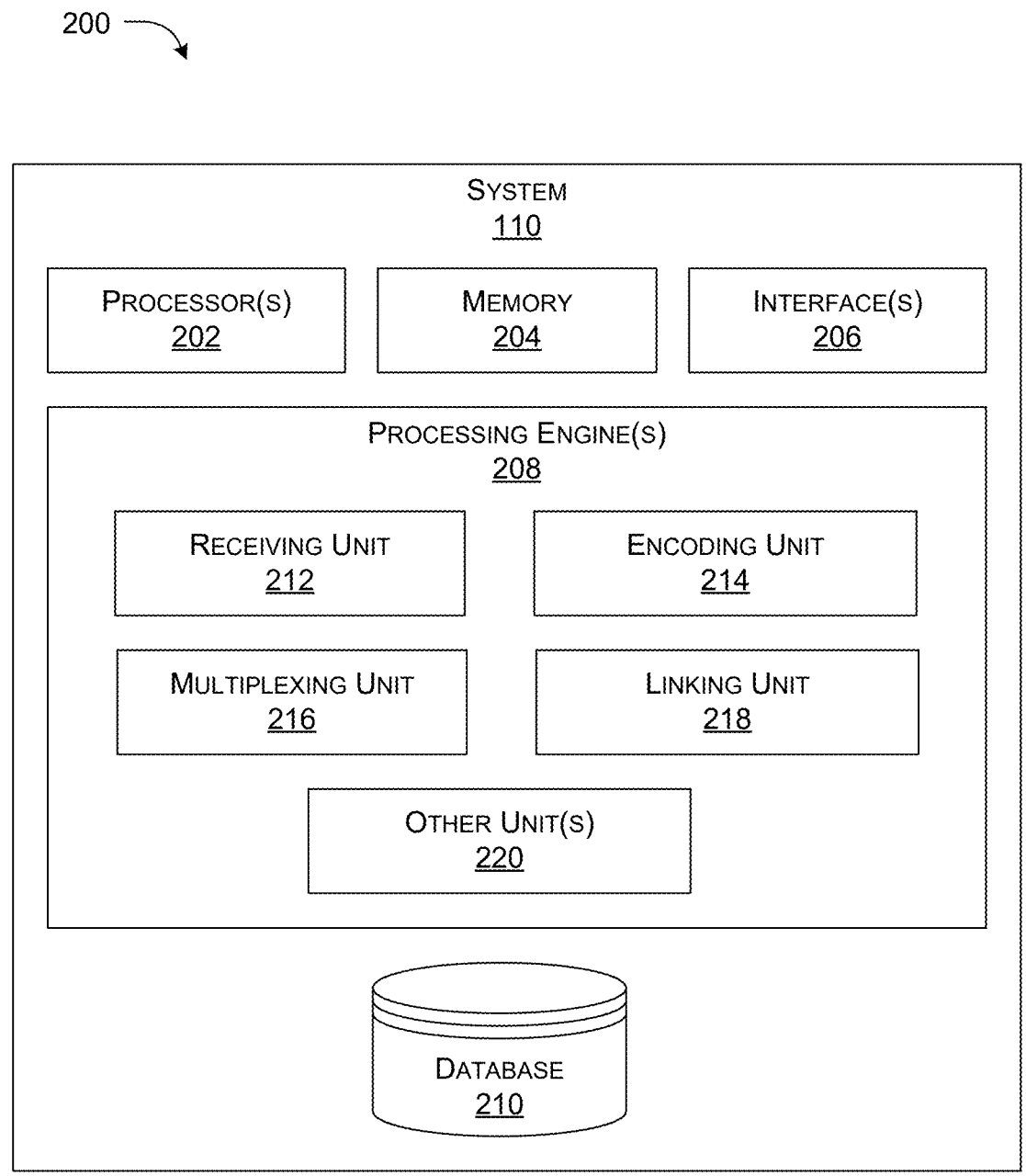
FIG. 2 illustrates exemplary functional units of the proposed system, in accordance with an embodiment of the present disclosure.

FIG. 2 illustrates, at 200, exemplary functional units of the proposed system 110, in accordance with an exemplary embodiment of the present disclosure. The system 110 may include one or more processor(s) 202. The one or more processor(s) 202 may be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 204. The memory 204 may store one or more computer-readable instructions or routines, which may be fetched and executed to create or share the data units over a network service. The memory 204 may include any non-transitory storage device including, for example, volatile memory such as RAM, or non-volatile memory such as EPROM, flash memory, and the like.

Further, the system 110 may include an Input/Output (I/O) interface 206. The Input/Output (I/O) interface 206 of the system 110 may be used to receive user inputs, from the one or more computing devices 104 associated with the one or more users 102. The processor 202 may be configured to the computing device 108. The processor 202 may be coupled with the memory 204. The memory 204 may store one or more instructions that are executable by the processor to populate the form using voice input.

In an embodiment, the system 110 may also include an interface(s) 206. The interface(s) 206 may include a variety of interfaces, for example, interfaces for data input and output devices, referred to as I/O devices, storage devices, and the like. The interface(s) 206 may facilitate communication with various other devices coupled to the one or more processor(s) 202. The interface(s) 206 may also provide a communication pathway for one or more components of the one or more processor(s) 202. Examples of such components include, but are not limited to, processing engine(s) 208 and database 210.

In an embodiment, the processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may include a processing resource (for example, one or more processors), to execute such instructions.

In the present examples, the machine-readable storage medium may store instructions that, when executed by the processing resource, implement the processing engine(s) 208. In such examples, the processor(s) 202 may include the machine-readable storage medium storing the instructions and the processing resource to execute the instructions, or the machine-readable storage medium may be separate but accessible to the system 110 and the processing resource. In other examples, the processing engine(s) 208 may be implemented by electronic circuitry. The database 210 may include data that is either stored or generated as a result of functionalities implemented by any of the components of the processing engine(s) 208. In an embodiment, the processing engine(s) 208 may include a receiving unit 212, an encoding unit 214, a multiplexing unit 216, a linking unit 218, and other units(s) 220. The other unit(s) 220 may implement functionalities that supplement applications/functions performed by the system 110. In another embodiment, the system 110, through the other unit(s) 220, may manage the muxing and storing of the manifest file in the storage server.

The authorization unit 112 communicatively coupled to a streaming server may receive one or more input streams from at least one streaming service through the receiving unit 212. The encoding unit 214 may use the encoder 114 that is associated with the authorization unit 112 to encode the received input streams using predefined codec configurations to generate corresponding one or more encoded streams.

The multiplexing unit 216 may use a muxer to multiplex the generated one or more encoded streams into at least one muxing. The at least one muxing includes livestream data and embedded metadata.

The authorization unit may use the linking unit 218 to link at least one of the muxing and one or more input/output (I/O) services into a manifest file. The manifest file may be stored in the storage server. The storage server may be configured to store the manifest file in a database of records that are arranged in a sequence of verification units. The verification units may correspond to at least one of a database or the blockchain of a plurality of blocks or a distributed data store, and wherein each block comprises a cryptographic hash of a previous block of records of the manifest file. Ethereum may be used as a blockchain platform.

Figure 3:
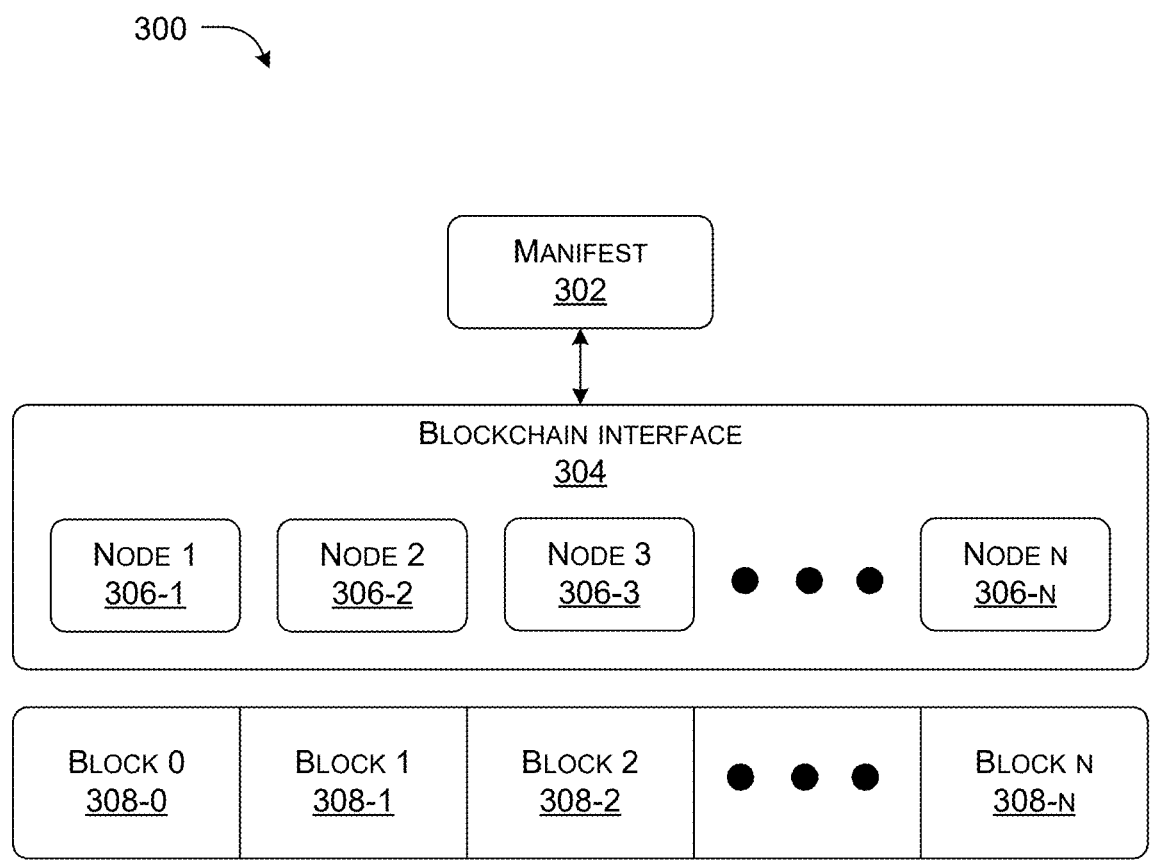
FIG. 3 illustrates an exemplary representation of a blockchain for storing a manifest file, in accordance with an embodiment of the present disclosure.

FIG. 3 illustrates an exemplary representation 300 of the blockchain for storing the manifest file, in accordance with an embodiment of the present disclosure. With respect to FIG. 3, an orchestration module (not shown) may execute instructions to store the manifest file 302 via a blockchain interface 304, that facilitate creation of the blockchain via use of one or more API functions. The blockchain interface 304 may include multiple nodes 306-1, 306-2, 306-3, ..., 306-N. Each of the nodes may correspond to a respective block 308-1, 308-2, 308-3, ..., 308-N. It may be noted, the manifest file may include, for example, metadata information associated with a particular data exchange transaction including, for example, a manifest identifier, a data exchange transaction batch identifier, a data stream identifier corresponding to shared data stream, a count of number of times the data stream is executed, origination time and source of the data stream, a hash value, a date and/or timestamp.

Figure 4:
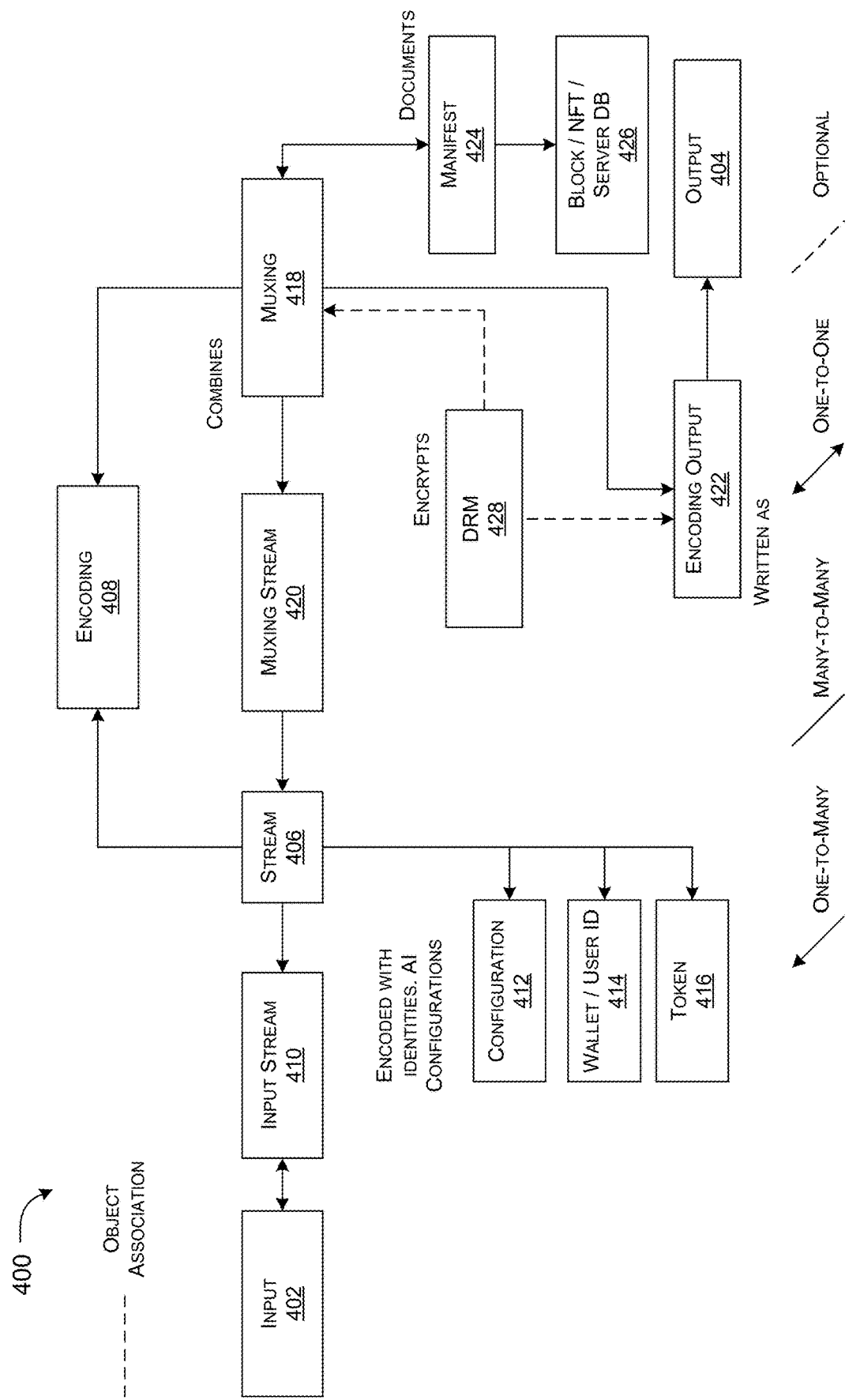
FIG. 4 illustrates an exemplary representation showing interconnected objects of the system, in accordance with an embodiment of the present disclosure.

FIG. 4 illustrates an exemplary representation 400 showing interconnected objects of the system 110, in accordance with an embodiment of the present disclosure. With respect to FIG. 4, an input object 402 may refer to a service or a server that provides access to files or live streams for ingestion. The input object 402 may be tailored to various service providers, such as Simple Storage Service (S3), Secure File Transfer Protocol (SFTP), Real Time Messaging Protocol (RTMP), and the like. In addition, an output object 404 may refer to a service or a server that is responsible for writing files or live streams generated by the encoder. Similar to the input object 402, the output object 404 may support multiple implementations, such as Google Cloud Storage (GCS) or Akamai Media Services Live (MSL), and the like. Further, a stream 406 that represents an actual data (for example, video, audio, captions, etc.) also known as an elementary stream, may be produced by the encoder. The stream may have the following relationships to function effectively:

(a) Encoding: A stream may be encoded, at 408, from one or more InputStreams, which are retrieved from a file or livestream hosted on one of the input services.

(b) InputStreams: InputStreams 410 may define a source data for the encoding. There may be specialized InputStreams that are of a specific type and have a directed purpose. It may be noted that a stream may be linked to multiple InputStreams.

(c) Codec configuration: The stream 406 may be encoded using a specific codec configuration provided by the Identities.AI service. The codec configuration defines parameters like metadata, ownership, resolution, bitrate, quality settings, and the like. The codec configurations are represented at 412, 414 and 416. In scenarios, when there is no other way to determine if the live streams are from an authorized user, a continuous learning Artificial Model (AI) may be used to determine a likelihood that the live stream is generated by the AI, and may be flagged as such. Here, the AI model may be used to extract/listen to a variety of audio/video signatures that are generated from widely available AI platforms and are used to create AI content. Further, the extracted signatures may be used to determine a likelihood of the livestream being generated from the AI source and not manually.

In an embodiment, the muxing may refer to a process of combining encoded bitstreams into containers that may be saved as files or may be streamed live. Further, muxing objects may represent the containers, with different specializations for various formats such as MP4 and MP3.

The muxing 418 may have the following relationships:

(a) Stream containment: The muxing 418 may contain one or more streams, established through MuxingStream 420 objects.

(b) Output Services: The muxing 418 may be written to multiple output services simultaneously as files or livestreams. To manage associations and provide essential details like output paths, filenames and access permissions, an EncodingOutput object 422 may be used.

(c) Multiple Associations: The muxing 418 may be linked to multiple EncodingOutput objects 422.

In an embodiment, a Digital rights management (DRM) object 428 contains all necessary information that is required to configure an encryption of the muxing. The DRM object 428 may also link to the output object 404 (via the EncodingOutput objects 422) and represent an encrypted version of the files or live streams that may be generated. One key advantage of the system 110 is that the muxing may be written in both an unencrypted form (via a direct link to the output object 404) and an encrypted form (via the DRM object 428).

In an embodiment, a manifest object 424 may be responsible for creating the manifest data that links generated files and streams with their respective outputs. The manifest object 424 may connect input and output services and the muxing 418 to either the blockchain/Non-Fungible Token (NFT) or a server-based database represented at 426 containing ownership and configuration data.

With respect to the system 110, a process begins with capturing an InputStream (audio, video, image, caption, etc.) for an identity session. This matches the concept of InputStreams, which serve as a data source for encoding. Next, a dynamic hash may be created for an identity session using Identities.DNA service (including its walled configuration and token). This step may align with configuring the encoding process, thus ensuring that each identity session is uniquely identified. In addition, a muxing process which combines encoded bitstreams into identity containers may be executed and is consistent with a standard definition of muxing, i.e., the encoded streams are combined into containers for the output. Further, a combined output stream may be processed through identities.ai's output service which matches the output description, where muxings are written to output services.

Thereafter, an event log and manifest may be created and persisted on the blockchain as a token. This may align with the manifest description, which associates generated files and streams with ownership records, ensuring traceability and ownership verification.

In an embodiment, the system 110 creates a unique hash that forms a direct association with used Identities.DNA, token, and wallet. Creation of the unique hash aligns with a concept of linking ownership and configuration data to a generated content. Further, an original input stream may be modified via the muxing to include a digital signature from the Identities.DNA that is consistent with the muxing process, thus emphasizing verification of authenticity and ownership. Thereafter, a manifest may be generated that matches the added stream, allowing for detection of authenticity in real time or as a sample file, which aligns with a purpose of the manifest object 424 to track and verify ownership and configuration details.

In some embodiments, during a live performance of the system 110, the muxing process may not be needed and only the bitstream may be sampled, i.e. bytes with a certain algorithm as a sample byte at a specific moment in the stream. Further, samples may be created as a session manifest of the bitstream with mixed metadata that includes both byte samples and owner's signature. This corresponds to taking a digital fingerprint multiple times, which creates a range of samples, that when 100% verified, may be accepted as a signed stream. Further, output bytes may be parsed and call identities may be backend to find the owner along with checking the authenticity of the owner.

In some embodiments, during an offline performance of the system 110, the muxing process may not be needed. Here, a local file bitstream bytes may be sampled with a certain algorithm on a specific moment as the sample byte. Further, sampling as a session manifest of the stream may be created with a mixed metadata that has the byte samples and the owner's signature. This is equivalent to taking a digital fingerprint multiple times, which creates a range of samples, that when 100% verified, may be accepted as a signed stream.

Figure 5:
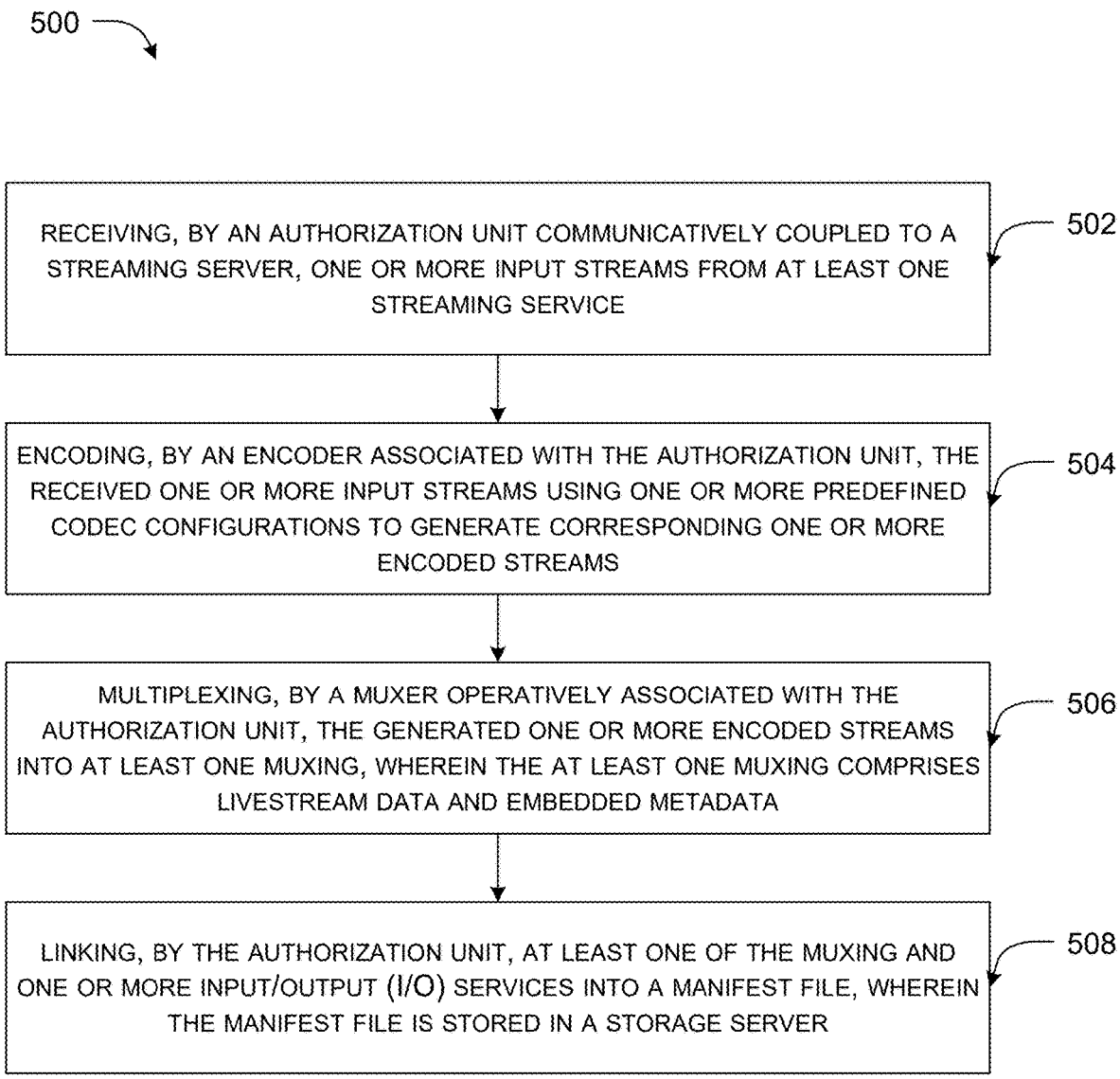
FIG. 5 is a flow diagram depicting a proposed method for muxing and storing the manifest file in a storage server, in accordance with an embodiment of the present disclosure.

FIG. 5 is a flow diagram depicting a proposed method 500 for the muxing and storing the manifest file in the storage server, in accordance with an embodiment of the present disclosure. With respect to FIG. 5, the method, at 502, includes using an authorization unit communicatively coupled to a streaming server to receive one or more input streams from at least one streaming service. At 504, the method includes using the encoder associated with the authorization unit to encode the received one or more input streams using one or more predefined codec configurations to generate corresponding one or more encoded streams. Further, at 506, the method includes multiplexing the generated one or more encoded streams into at least one muxing by a muxer that is operatively associated with the authorization unit. The muxing comprises livestream data and embedded metadata. Furthermore, the method, at 508 includes linking at least one of the muxing and one or more input/output (I/O) services into a manifest file. The manifest file is stored in the storage server.

Those skilled in the art would appreciate that embodiments of the present disclosure presents a comprehensive workflow for bitstream multiplexing (muxing) and encoding, explaining creation, manipulation, and storage of various data objects and their interactions within the system. A key feature of this workflow is an ability for the users to embed a unique, permanent configuration, similar to a watermark into their livestream data, thus allowing for a personalized identification of the origin of the stream. This watermarked livestream data may then be stored securely on the storage server, such as the blockchain, ensuring tamper-proof and verifiable records. Further, the workflow describes how the bitstream encoder retrieves the input streams from designated input services that are encoded according to specific codec configurations and transforms the input streams into encoded streams. Once encoded, the streams may be multiplexed, combined into muxings and sent to appropriate output services. This step-by-step procedure may allow for seamless encoding, watermarking, and storage of livestream data, thus ensuring both personalization and security throughout the entire workflow.

Figure 6:
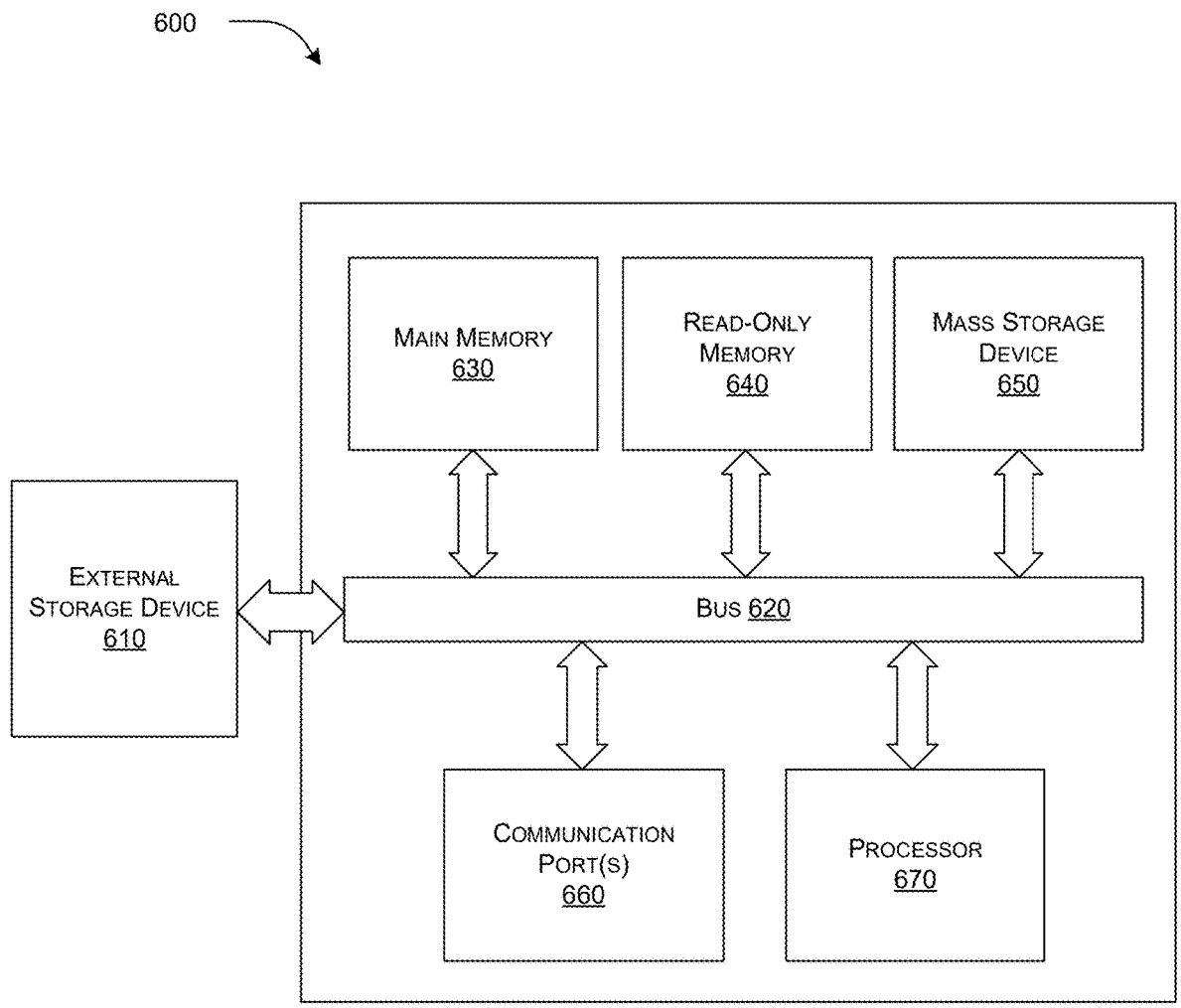
FIG. 6 illustrates an exemplary computer system in which or with which embodiments of the present disclosure may be utilized in accordance with embodiments of the present disclosure.

FIG. 6 illustrates an exemplary computer system 600 in which or with which embodiments of the present disclosure may be implemented. As shown in FIG. 6, the computer system 600 may include an external storage device 610, a bus 620, a main memory 630, a read-only memory 640, a mass storage device 650, communication port(s) 660, and a processor 670. A person skilled in the art will appreciate that the computer system 600 may include more than one processor and communication ports. The processor 670 may include various modules associated with embodiments of the present disclosure. The communication port(s) 660 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 660 may be chosen depending on a network, such a Local Area Network (LAN), Wide Area Network (WAN), or any network to which the computer system 600 connects. The main memory 630 may be random access memory (RAM), or any other dynamic storage device commonly known in the art. The read-only memory 640 may be any static storage device(s) e.g., but not limited to, a Programmable Read Only Memory (PROM) chips for storing static information e.g., start-up or BIOS instructions for the processor 670. The mass storage device 650 may be any current or future mass storage solution, which can be used to store information and/or instructions. Exemplary mass storage device 650 includes, but is not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks.

The bus 620 communicatively couples the processor 670 with the other memory, storage, and communication blocks. The bus 620 may be, e.g. a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects the processor 670 to the computer system 600.

Optionally, operator and administrative interfaces, e.g. a display, keyboard, joystick, and a cursor control device, may also be coupled to the bus 620 to support direct operator interaction with the computer system 600. Other operator and administrative interfaces can be provided through network connections connected through the communication port(s) 660. Components described above are meant only to exemplify various possibilities. In no way should the aforementioned exemplary computer system 600 limit the scope of the present disclosure.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

Advantages of the Present Disclosure

The present disclosure provides a system and a method for muxing and storing a manifest file in a storage server.

The present disclosure provides a system and a method to use the manifest file to determine users whose claims to the media stream are legitimate, or even to locate certain legitimate users.

The present disclosure provides a system and a method for maintaining the storage server in form of a blockchain.

The present disclosure provides a system and a method where the blockchain utilizes Ethereum as a blockchain platform.

The present disclosure provides a system and a method for maintaining embedded metadata at a streaming server.

The present disclosure provides embedded metadata that has information related to metadata settings, ownership, resolution, bitrate, and quality settings corresponding to a codec.

We claim:

1. A method comprising:
   receiving, by an authorization unit communicatively coupled to a streaming server, one or more live input streams from at least one streaming service;
   encoding, by an encoder associated with the authorization unit, the received one or more live input streams using one or more predefined codec configurations to generate corresponding one or more encoded streams;
   multiplexing, by a muxer operatively associated with the authorization unit, the generated one or more encoded streams into at least one muxing, wherein the at least one muxing comprises livestream data and embedded metadata, the embedded metadata including a permanent watermark indicative of a unique signature of the owner of the livestream, the permanent watermark facilitating use by an output service to identify the origin of the livestream data and verification of authenticity of the livestream data; and
   linking, by the authorization unit, at least one of the muxing and at least one of one or more input/output (I/O) services into a manifest file, wherein the manifest file is stored in a storage server and sent to the at least one of the one or more output services, and wherein the at least one of the one or more output services utilizes the manifest file to authenticate traceability and ownership verification of the livestream based at least in part upon the permanent watermark stored in the manifest file.

2. The method as claimed in claim 1, wherein the embedded metadata is maintained at the streaming server, and where the embedded metadata comprises one or more codec parameters.

3. The method as claimed in claim 2, wherein the one or more codec parameters are any or a combination of information related to metadata settings, ownership, resolution, bitrate, and quality settings corresponding to a codec.

4. The method as claimed in claim 2, wherein the one or more codec parameters are used to determine an origination source of the one or more encoded streams and a degree of authenticity of the livestream data.

5. The method as claimed in claim 1, wherein the storage server is further configured to store the manifest file in a database of records that are arranged in a sequence of verification units.

6. The method as claimed in claim 5, wherein the sequence of verification units correspond to at least one of a database or a blockchain or a plurality of blocks or a distributed data store, and wherein each block comprises a cryptographic hash of a previous block of records of the manifest file.

7. The method as claimed in claim 6, wherein the blockchain utilizes Ethereum as a blockchain platform.

8. The method as claimed in claim 1, wherein at least one of the muxing is maintained in either an unencrypted form and an encrypted form.

9. The method as claimed in claim 1, further comprising:
   executing, by a Digital rights management (DRM) unit operatively coupled to the authorization unit, an encryption of at least one of the muxing.

10. A system comprising:
    an authorization unit communicatively coupled to a streaming server; and
    a memory operatively coupled to an encoder and a muxer of the authorization unit, wherein the memory comprises processor-executable instructions, which on execution, cause the one or more processors to:
    receive one or more live input streams from at least one streaming service;
    encode the received one or more live input streams using one or more predefined codec configurations to generate corresponding one or more encoded streams;
    multiplex the generated one or more encoded streams into at least one muxing, wherein the at least one muxing comprises livestream data and embedded metadata, the embedded metadata including a permanent watermark indicative of a unique signature of the owner of the livestream, the permanent watermark facilitating use by an output service to identify the origin of the livestream data and verification of authenticity of the livestream data; and
    link at least one of the muxing and at least one of one or more input/output (I/O) services into a manifest file, wherein the manifest file is stored in a storage server and sent to the at least one of the one or more output services, and wherein the at least one of the one or more output services utilizes the manifest file to authenticate traceability and ownership verification of the livestream data based at least in part upon the permanent watermark stored in the manifest file.

11. The system as claimed in claim 10, wherein the embedded metadata is maintained at the streaming server, and where the embedded metadata comprises one or more codec parameters.

12. The system as claimed in claim 11, wherein the one or more codec parameters are any or a combination of information related to metadata settings, ownership, resolution, bitrate, and quality settings corresponding to a codec.

13. The system as claimed in claim 11, wherein the one or more codec parameters are used to determine an origination source of the one or more encoded streams and a degree of authenticity of the livestream data.

14. The system as claimed in claim 10, wherein the storage server is further configured to store the manifest file in a database of records that are arranged in a sequence of verification units.

15. The system as claimed in claim 14, wherein the sequence of verification units correspond to at least one of a database or a blockchain of a plurality of blocks or a distributed data store, and wherein each block comprises a cryptographic hash of a previous block of records of the manifest file.

16. The system as claimed in claim 15, wherein the blockchain utilizes Ethereum as a blockchain platform.

17. The system as claimed in claim 10, wherein at least one of the muxing is maintained in either an unencrypted form and an encrypted form.

18. The system as claimed in claim 10, wherein a Digital rights management (DRM) unit operatively coupled to the authorization unit is configured to execute an encryption of at least one of the muxing.

19. A non-transitory computer-readable medium comprising processor-executable instructions that, when executed, cause a processor to:
  receive one or more live input streams from at least one streaming service;
  encode the received one or more live input streams using one or more predefined codec configurations to generate corresponding one or more encoded streams;
  multiplex the generated one or more encoded streams into at least one muxing, wherein the at least one muxing comprises livestream data and embedded metadata, the embedded metadata including a permanent watermark indicative of a unique signature of the owner of the livestream, the permanent watermark facilitating use by an output service to identify the origin of the livestream data and verification of authenticity of the livestream data; and
  link at least one of the muxing and at least one of one or more input/output (I/O) services into a manifest file, wherein the manifest file is stored in a storage server and sent to the at least one of the one or more output services, and wherein the at least one of the one or more output services utilizes the manifest file to authenticate traceability and ownership verification of the livestream data based at least in part upon the permanent watermark stored in the manifest file.

20. The non-transitory computer-readable medium as claimed in claim 19, wherein the storage server is further configured to store the manifest file in a database of records that are arranged in a sequence of verification units.

* * * * *